Jan. 5, 1971     B. J. NEWBURY     3,551,983
PIPE GUIDE WITH FIXED POSITION ROLLERS
Filed May 3, 1968     2 Sheets-Sheet 1
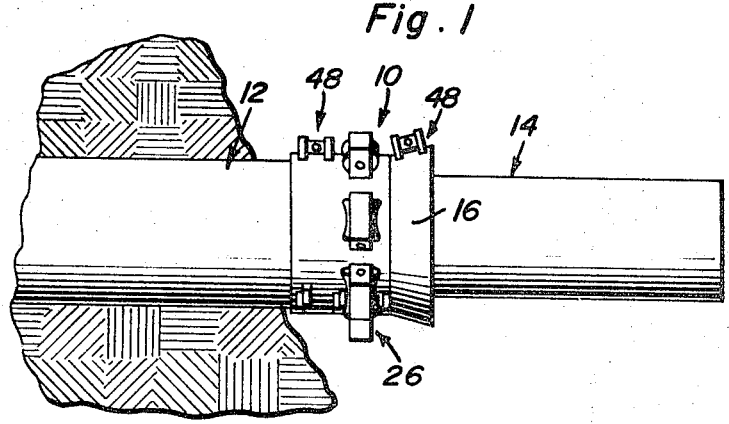
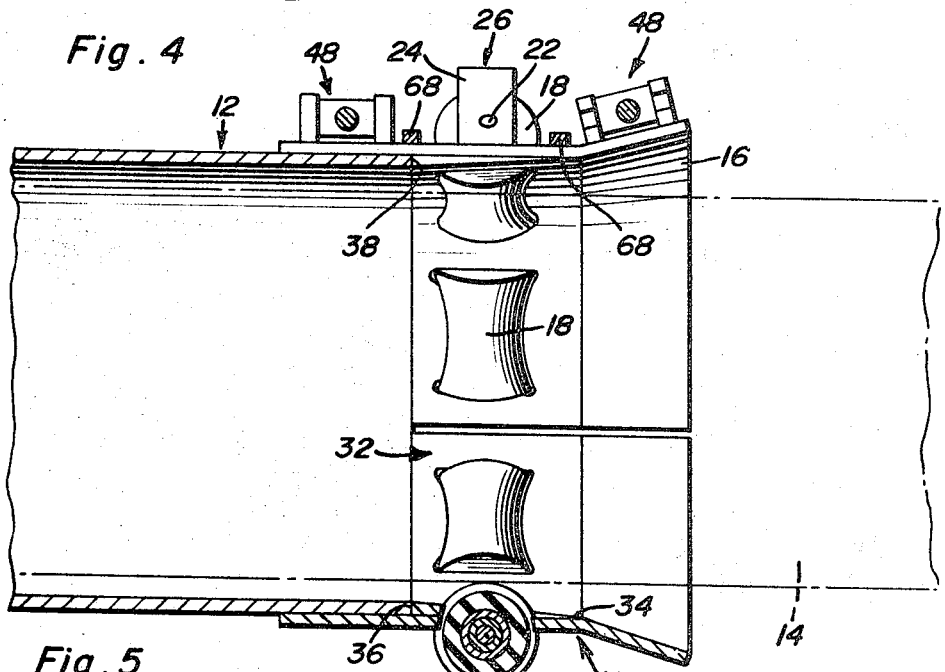
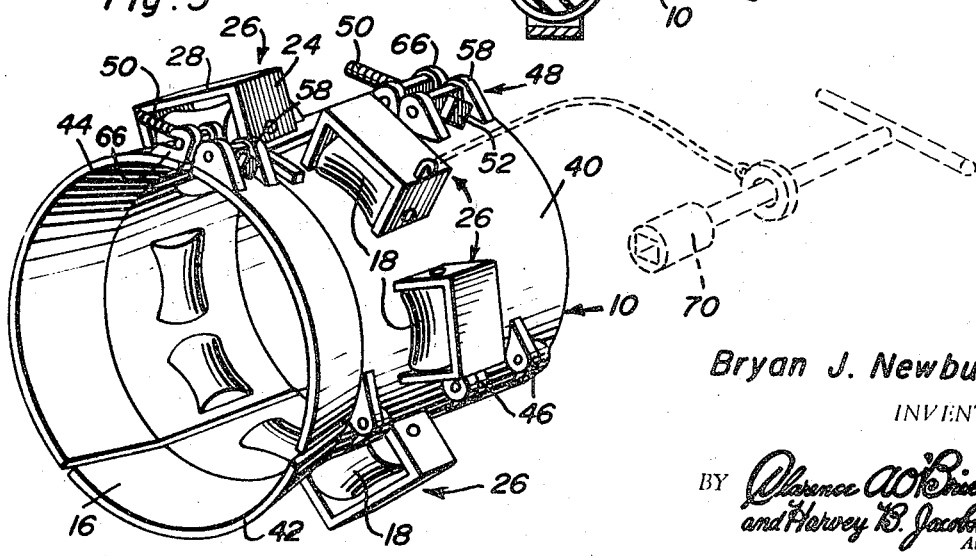
Bryan J. Newbury
INVENTOR.
BY Clarence A. O'Brien
and Harvey B. Jackson
Attorneys Jan. 5, 1971  B. J. NEWBURY  3,551,983
PIPE GUIDE WITH FIXED POSITION ROLLERS
Filed May 3, 1968  2 Sheets-Sheet 2
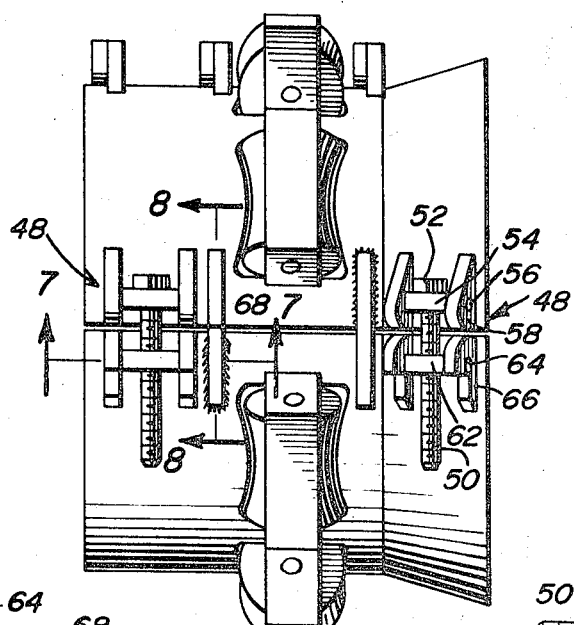
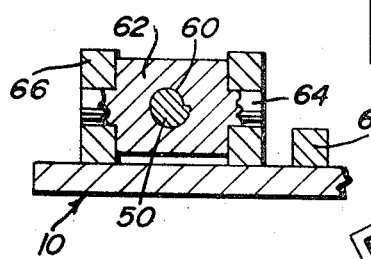
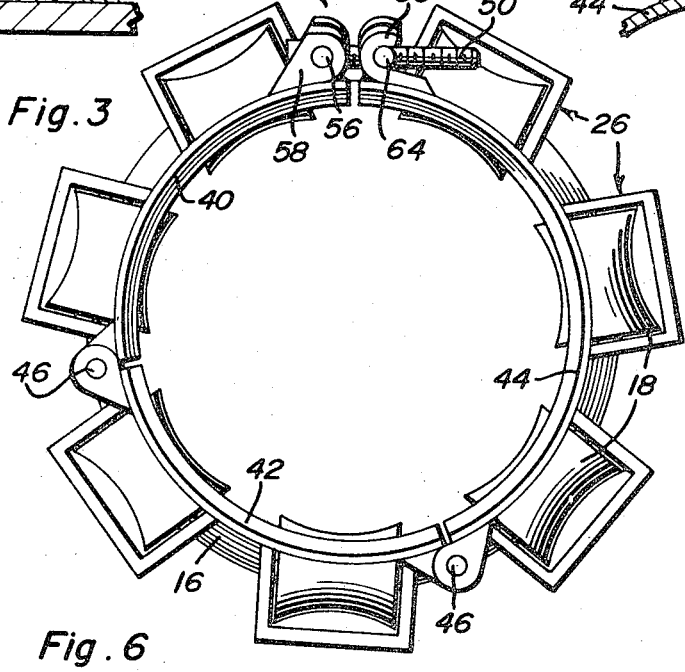
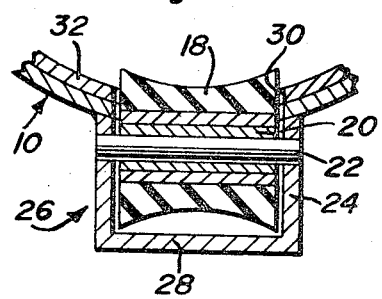
Bryan J. Newbury
INVENTOR.
BY *Clarence A. O'Brien*
*and Harvey B. Jacobson*
Attorneys United States Patent Office 3,551,983
Patented Jan. 5, 1971

3,551,983
PIPE GUIDE WITH FIXED POSITION ROLLERS
Bryan J. Newbury, P.O. Box 123,
Woodsboro, Tex. 78393
Filed May 3, 1968, Ser. No. 726,499
Int. Cl. B23p *19/00*
U.S. Cl. 29—200                                    11 Claims

ABSTRACT OF THE DISCLOSURE

A pipe guide consisting of three pivotally interconnected arcuate sections releasably clampable in surrounding relation to one end of a casing for the guided insertion of a pipe therein. The guide mounts seven rollers positioned peripherally thereabout and projecting inwardly thereof for rolling support of an inserted pipe. The guide includes abutment means for proper alignment thereof with the end of the casing and latches for releasably clamping the guide to the casing.

---

The instant invention is generally concerned with the positioning of pipelines, and more particularly relates to a unique pipe or pipeline guide for use in facilitating the introduction of a pipe into a casing through the utilization of pipe supporting rollers.

The guide of the instant invention is particularly adapted for clamp mounting on the outer end of a pipeline casing so as to rollingly support and guide a pipeline being introduced into the casing in a manner which both greatly facilitates the movement of the pipeline into the casing and eliminates any possibility of damage to the protective coating normally applied on the pipeline. The guide is sectional in nature and can be positioned laterally about a casing or pipeline for a rigid clamping to the casing end portion through a pair of clamping units engaged between two of the sections. The guide includes an alignment shoulder for abutting the extreme end of the casing so as to provide for a proper positioning of the guide thereon, and in addition is provided with a flared mouth so as to facilitate introduction of the pipeline. Furthermore, a plurality of pipe supporting rollers are provided circumferentially about the guide with these rollers enabling an accommodation of pipelines of varying sizes from a maximum size wherein all of the rollers are engaged through a series of smaller sizes which will be supported on selected ones of the lower rollers.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of the guide of the instant invention mounted in operative position on an embedded casing with a pipe partially extended therethrough;

FIG. 2 is an enlarged side elevational view of the guide;

FIG. 3 is a rear elevational view of the guide;

FIG. 4 is a longitudinal cross-sectional view through the guide;

FIG. 5 is a perspective view of the guide;

FIG. 6 is an enlarged cross-sectional detail through one of the roller units;

FIG. 7 is an enlarged cross-sectional view taken substantially on plane passing along line 7—7 in FIG. 2; and FIG. 8 is an enlarged cross-sectional view taken substantially on a plane passing along line 8—8 in FIG. 2.

Referring now more specifically to the drawings, reference numeral 10 is used to generally designate the pipe or pipeline guide comprising the instant invention. Briefly, the guide 10 is removably mounted on one projecting end of an embedded protective casing 12 for the controlled guiding of a pipe 14 into the casing 12 in a manner which both facilitates the introduction of the pipe 14 and avoids damage thereto.

The guide 10 is of a hollow cylindrical configuration having a flared mouth or pipe receiving end 16 so as to facilitate the alignment and introduction of a length of pipe 14. A series of pipe supporting rollers 18 are provided. Each of the rollers 18 is rotatably mounted, through an appropriate bearing sleeve 20, on a steel shaft 22 extending between the opposed outwardly directed legs 24 of a wheel support bracket 26 mounted on the outer surface of the pipe guide 10 immediately inwardly of the flared mouth 16. The inner ends of the bracket legs 24 are welded directly to the body of the guide 10 and are interconnected, at the outer ends thereof, by a transverse roller covering plate 28 which combines with the legs in providing a partial housing for the corresponding roller 18. Each of the rollers 18 projects through an opening 30 provided in the guide 10 immediately thereunder with the projection of the roller into the interior of the guide 10 being sufficient so as to provide for a support of an inserted pipe 14 out of contact with the interior of the guide 10. Each of the openings 30 is of a configuration so as to closely conform to the roller which revolves therein, the rollers themselves including a concave periphery which results in a tendency for an inserted pipe 14 to be supported on the opposed enlarged diameter ends of the rollers 18.

With particular reefrence to FIG. 4, an internal positioning collar 32 is affixed within the guide 10 immediately inward of the flared mouth 16. This positioning collar 32 tapers from a feathered edge 34 approximately at the juncture of the flared mouth 16 and the cylindrical body, inwardly to a raised abutment face 36 defined by the inner annular edge of the collar 32. This inner edge or abutment face 36 seats against the edge 38 of the casing 12 and properly positions the guide 10 on the casing 12 with the pipe supporting rollers 18 being located just forward of the end of the casing 12. Incidently, the roller openings 30 also of course extend through the positioning collar 32. Further, the tapered surface of the collar 32 also tends to appropriately guide an inserted pipe end onto the support rollers.

The guide 10 is formed in three separate sections 40, 42 and 44, each of which extends the full length of the guide 10 and is of an arcuate configuration which, when combined with the other sections, forms the cylindrically configured guide 10 including the continuous flared mouth 16, positioning collar 32 and series of rollers 18. The sections 40 and 44 are each hinged, by three hinging units 46, to the opposed longitudinal edges of the center section 42, while the second edges of the two sections 40 and 44 are releasably interlocked by a pair of latch units 48 which, upon release, allow the sections 40, 42 and 44, to pivot to an open position so as to be mounted laterally about a casing and pipe should such be desired. This latter situation could conceivably arise when it becomes desirable to use the guide 10 to support a pipe 14 already partially inserted within a casing 12.

Each of the latches or latch units 48 includes an elongated threaded bolt 50 rotatably mounted, adjacent the head 52 thereof, in a plate 54 which in turn is rotatably mounted, through laterally projecting stubs 56, between the pair of laterally spaced ears or brackets 58 fixed to the guide section 40 adjacent the free edge thereof. The bolt 50 is in turn threadedly received through an internally threaded hole 60 within a plate-like nut 62 which, through oppositely directed stub shafts 64, is rotatably supported within a pair of opposed brackets or ears 66 rigidly affixed, as by welding, to the section 44, also immediately adjacent the free edge thereof and in alignment with the brackets 58. It will be noted that each of the brackets or ears 66 actually forms seating notches for the shaft-like stubs 64 of the nuts 62 whereby, upon a loosening of the corresponding bolt 50, the nut 62 can move rearwardly out of the seating notches and swung clear through the rotatably mounted bolt supporting plate 54 so as to enable an opening of the sections. The latch units 48 through the elongated latch bolts 50, can of course be utilized to clamp the guide 10 about casings 12 of different diameters within a limited range. The latch units 48 themselves are located adjacent the opposite ends of the guide 10, one latch unit 48 being actually mounted on the flared mouth of the guide 10. In addition, in order to facilitate an alignment of the sections, a pair of aligning fingers 68 are provided, one welded to each other of the sections 40 and 44 and projecting laterally from the free edge thereof for overlying the adjacent section and guiding the two sections toward each other and avoiding any tendency for the sections to twist or misalign, such fingers 68, nothing FIG. 8 in particular, having a slightly arcuate configuration following that of the sections. Finally, noting FIG. 5, it is contemplated that a T-handled socket wrench 70, for use in adjusting the latch bolts, be tethered directly to the guide 10 for convenience and ready accessibility.

From the foregoing, it will be appreciated that a highly unique pipe guide has been defined, this guide being particularly adapted for mounting on a casing in a rapid and simplified manner for the guided reception of a pipe therethrough. The guide is in fact self-positioning on the casing and is adaptable to casings of varying sizes for the purpose of providing a rolling support for the introduction of a pipeline therethrough.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:
1. A pipe guide for guiding a pipe for insertion within a casing or the like, said guide comprising a hollow generally cylindrical body having opposed open forward and rear end portions axially aligned for movement of a pipe therethrough, a series of pipe supporting friction reducing rollers provided peripherally about said body and projecting radially inward thereof, said rollers being located rearwardly of the forward end portion of the body and rotatably mounted on axes transverse of the axis of the cylindrical body, and guide positioning means mounted on the body and projecting inwardly thereof so as to define abutment means rearward of said rollers and engageable against the end of a casing or the like upon which the guide is to be mounted.

2. The guide of claim 1 including mounting means on said body for selectively reducing the diameter thereof for a clamping engagement of the body about a casing or the like.

3. The guide of claim 2 wherein the forward end portion of said body is outwardly flared peripherally about said body so as to define an enlarged-guiding mouth.

4. The guide of claim 2 wherein said body is formed of three individual folding sections, each section being of a generally arcuate configuration and mounting at least one roller between opposed front to rear edges, means hingedly engaging two of said sections with the opposed edges of the third section, said mounting means being engaged between the free edges of the first two sections for selectively moving said free edges toward and away from each other.

5. The guide of claim 4 wherein said guide positioning means comprises a generally annular collar mounted within said body, said annular collar having a tapered cross-section extending rearwardly from a thin forward edge thereof positioned adjacent the forward end portion rearwardly to an increased rear edge which forms said abutment means.

6. The guide of claim 1 wherein said guide positioning means comprises a generally annular collar mounted within said body, said annular collar having a tapered cross-section extending rearwardly from a thin forward edge thereof positioned adjacent the forward end portion rearwardly to an increased rear edge which forms said abutment means.

7. A pipe guide comprising a hollow generally cylindrical body having opposed forward and rear end portions, the forward end portion of said body being outwardly flared peripherally thereabout, a series of pipe supporting rollers rotatably mounted on said body rearward of the flared end thereof, said rollers projecting inwardly toward the axial center of said body for engagement with a received pipe, said body being formed in three separate sections, two of said sections each having an edge hingedly secured to an edge of the third section positioned therebetween, each of said first sections having a free edge, and latch means selectively extended between the two free edges for a clamping movement of these free edges toward each other.

8. The guide of claim 7 including at least one alignment finger fixed to each of the first two sections adjacent the free edge thereof and projecting laterally therefrom into overlying relation with the free edge portion of the adjacent section.

9. The guide of claim 7 including guide positioning means mounted on the body and projecting inwardly thereof so as to define abutment means rearward of said rollers and engageable against the end of a casing or the like upon which the guide is to be mounted.

10. The guide of claim 9 wherein said guide positioning means comprises a generally annular collar mounted within said body, said annular collar having a tapered cross-section extending rearwardly from a thin forward edge thereof positioned adjacent the forward end portion of the body rearwardly to an increased rear edge which forms said abutment means, a portion of said annular collar being defined on each of said three separate sections.

11. A pipe guide comprising a hollow generally cylindrical body having opposed axially aligned forward and rear open end portions, a series of pipe supporting rollers rotatably mounted on said body rearward of the forward end thereof for rotation about axes transverse of the axis of said body, said rollers projecting inwardly toward the axial center of said body for engagement with a received pipe, said body being formed in three separate sections, each of said sections mounting at least one of said rollers, two of said sections each having an edge hingedly secured to an edge of the third section positioned therebetween, each of said first sections having a free edge, and latch means selectively extending between the two free edges for a clamping movement of the free edges toward each other.

References Cited

UNITED STATES PATENTS 2,975,662   3/1961   Courtot _____ 29—200
3,324,275   6/1967   Peignen _____ 228—4

THOMAS H. EAGER, Primary Examiner

U.S. Cl. X.R.

228—49